United States Patent
Swift et al.

(10) Patent No.: US 6,912,575 B1
(45) Date of Patent: Jun. 28, 2005

(54) SYSTEM AND METHOD FOR AUTOMATICALLY DETERMINING RECOMMENDED COMMITTED INFORMATION RATE IN A FRAME RELAY NETWORK

(75) Inventors: Larry Swift, Clearwater, FL (US); Ted N. Mawhinney, Clearwater, FL (US); Rick Silva, St. Petersburg, FL (US)

(73) Assignee: Paradyne Corporation, Largo, FL (US)

(*) Notice: Subject to any disclaimer, the term of this patent is extended or adjusted under 35 U.S.C. 154(b) by 577 days.

(21) Appl. No.: 09/338,812

(22) Filed: Jun. 23, 1999

(51) Int. Cl.[7] .................................. G06F 15/173
(52) U.S. Cl. ............................................ 709/226
(58) Field of Search .......................... 709/223, 224, 709/232, 233, 234, 235, 226; 370/237, 337

(56) References Cited

U.S. PATENT DOCUMENTS

| | | | |
|---|---|---|---|
| 5,812,545 A | * | 9/1998 | Liebowitz et al. .......... 370/337 |
| 5,867,483 A | | 2/1999 | Ennis, Jr. et al. ........... 370/252 |
| 5,898,673 A | * | 4/1999 | Riggan et al. ............... 370/237 |
| 5,974,457 A | * | 10/1999 | Waclawsky et al. ........ 709/224 |

* cited by examiner

Primary Examiner—Paul H. Kang
(74) Attorney, Agent, or Firm—Thomas, Kayden, Horstmeyer & Risley, LLP

(57) ABSTRACT

A system and method are disclosed for using tolerances obtained from a user together with historical information about a communication network to analyze the network's performance and to calculate and recommend a specific change to the committed information rate (CIR) over a given frame relay permanent virtual circuit (PVC). The historical information, which is collected by a network management system connected to at least two communication devices in a communication network, relates to various performance parameters, which may include the total data transmitted, received and dropped above and within the original CIR, and the burstiness of the data. The historical information is automatically analyzed in view of the user's designated tolerances to determine the network's data transmission performance, and a forward-looking recommendation of an optimum CIR is made, based on the analysis. The results of the analysis and the recommended change to the CIR are displayed to the user in a graphical format.

21 Claims, 7 Drawing Sheets

| Time Interval (Weekly) | | 1 | 2 | 3 | 4 | 5 | Trend 321 | Trend % 320 |
|---|---|---|---|---|---|---|---|---|
| Unacceptable Data Lost Above CIR | 301 | 7.8 | 7.9 | 8.5 | 10.7 | 10.4 | 10.7 | 9% |
| Acceptable Data Lost Above CIR | 302 | 1.4 | 1.5 | 1.7 | 2.1 | 2.1 | 2.2 | 2% |
| Received Above CIR | 303 | 4.4 | 5.2 | 6.4 | 7.9 | 8.6 | 8.7 | 13% |
| Dropped Within CIR | 304 | 0.1 | 4.1 | 0.1 | 0.1 | 0.1 | 0.1 | -5% |
| Received Within CIR | 305 | 20.0 | 21.0 | 24.0 | 27.0 | 28.0 | 28.4 | 26% |
| Total Tx | 323 | 33.7 | 39.6 | 40.6 | 47.8 | 49.2 | 50.0 | 47% |
| 301% of CIR - Be | 311 | 0.1 | 4.1 | 0.1 | 0.1 | 0.1 | 0.1 | -5% |
| 201% - 300% of CIR | 312 | 1.4 | 1.9 | 1.5 | 2.0 | 2.1 | 2.1 | 2% |
| 101% - 200% of CIR | 313 | 12.1 | 8.5 | 14.9 | 18.6 | 18.9 | 19.3 | 28% |
| 61% - 100% of CIR | 314 | 8.0 | 11.5 | 11.1 | 12.8 | 14.7 | 14.6 | 17% |
| 0 - 60% of CIR | 315 | 12.1 | 13.6 | 13.0 | 14.3 | 13.4 | 13.9 | 4% |
| Loss Above CIR | 322 | 68% | 64% | 61% | 62% | 59% | | 12% |
| Acceptable Loss Above CIR: 10 % | 324 | Current CIR: 128 Kbps | | 325 | Recommended CIR: 139 Kbps | | | 326 |

Fig. 4B

SYSTEM AND METHOD FOR AUTOMATICALLY DETERMINING RECOMMENDED COMMITTED INFORMATION RATE IN A FRAME RELAY NETWORK

TECHNICAL FIELD

The present invention relates generally to data communications, and more particularly, to a system and method for automatically determining a recommended committed information rate (CIR) in a frame relay network by analyzing historical information regarding network parameters in view of user designated tolerances, and recommending adjustments to the CIR based on the analysis.

BACKGROUND OF THE INVENTION

Historically, in the field of data communications, modems, data service units (DSU's), or channel service units (CSU's) have been used to convey information from one location to another. Digital technology now enables other communication devices, such as frame relay data service units (DSU's) and frame relay access units (FRAU's) to communicate large amounts of data at higher speeds. The communication scheme employed by these devices generally adheres to a model, known as the Open Systems Interconnect (OSI) Seven-Layer model. This model specifies the parameters and conditions under which information is formatted and transferred over a given communications network. A general background of the OSI seven-layer model follows.

In 1978, a framework of international standards for computer network architecture known as "OSI" (Open Systems Interconnect) was developed. The OSI reference model of network architecture consists of seven layers. From the lowest to the highest, the layers are: (1) the physical layer; (2) the datalink layer; (3) the network layer; (4) the transport layer; (5) the session layer; (6) the presentation layer; and (7) the application layer. Each layer uses the layer below it to provide a service to the layer above it. The lower layers are implemented by lower level protocols which define the electrical and physical standards, perform the byte ordering of the data, and govern the transmission, and error detection and correction of the bit stream. The higher layers are implemented by higher level protocols which deal with, inter alia, data formatting, terminal-to-computer dialogue, character sets, and sequencing of messages.

Layer 1, the physical layer, controls the direct host-to-host communication between the hardware of the end users' data terminal equipment (e.g., a modem connected to a PC).

Layer 2, the datalink layer, generally fragments the data to prepare it to be sent on the physical layer, receives acknowledgment frames, performs error checking, and re-transmits frames which have been incorrectly received.

Layer 3, the network layer, generally controls the routing of packets of data from the sender to the receiver via the datalink layer, and it is used by the transport layer. An example of the network layer is the Internet Protocol (IP), which is the network layer for the TCP/IP protocol widely used on Ethernet networks. In contrast to the OSI seven-layer architecture, TCP/IP (Transmission Control Protocol over Internet Protocol) is a five-layer architecture which generally consists of the network layer and the transport layer protocols.

Layer 4, the transport layer, determines how the network layer should be used to provide a point-to-point, virtual, error-free connection so that the end point devices send and receive uncorrupted messages in the correct order. This layer establishes and dissolves connections between hosts. It is used by the session layer. TCP is an example of the transport layer.

Layer 5, the session layer, uses the transport layer and is used by the presentation layer. The session layer establishes a connection between processes on different hosts. It handles the creation of sessions between hosts as well as security issues.

Layer 6, the presentation layer, attempts to minimize the noticeability of differences between hosts and performs functions such as text compression, and format and code conversion.

Layer 7, the application layer, is used by the presentation layer to provide the user with a localized representation of data which is independent of the format used on the network. The application layer is generally concerned with the user's view of the network and generally deals with resource allocation, network transparency and problem partitioning.

The communications networks that operate within the OSI seven-layer model include a number of paths or links that are interconnected to route voice, video, and/or digital data (hereinafter, collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user.

This type of network is conventionally referred to as a "circuit-switching network". Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility, and finally delivered to the proper destination node. A variety of techniques for efficiently multiplexing data from multiple source nodes onto a single circuit of the network are presently employed in private line networks. For instance, time division multiplexing (TDM) affords each source node full access to the allotted bandwidth of the circuit for a small amount of time. The circuit is divided into defined time segments, with each segment corresponding to a specific source node, to provide for the transfer of data from those source nodes, when called upon, through the network.

Another type of network is conventionally referred to as a "packet switching network". Frame-relay networks are one implementation of a packet-switching network. Packet-switching networks, as opposed to circuit-switching networks, allow multiple users to share data network facilities and bandwidth, rather than providing a specific amount of dedicated bandwidth to each user, as in TDM. Instead, packet switches divide bandwidth into connectionless, virtual circuits. Virtual circuits can be permanent virtual circuits (PVC's) or switched virtual circuits (SVC's). As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit). Frame relay generally operates within layer 2 (the data link layer) of the OSI model, and is an improvement over previous packet switching techniques, such as the industry standard X.25, in that frame relay requires significantly less overhead.

In frame relay networks, as in all communication networks, access to the network is provided by a network service provider. These service providers generally provide the communication and switching facilities over which the above-mentioned communication devices operate. Typically, an end user desirous of establishing a communications network, provisions, or obtains from a network service provider, network services in the form of a public switched service network. An example of a public switched network is the public switched telephone network (PSTN) or a public data network (PDN). These public networks typically sell network services, in the form of connectivity, to end users.

Typically an end user of a public network will purchase a particular level of service from the network service provider. This level of service can be measured by, for example, network availability as a percentage of total time on the network, the amount of data actually delivered through the network compared to the amount of data attempted or possibly the network latency, or the amount of time it takes for a particular communication to traverse the network.

Service providers typically provide service level agreements (SLA) that guarantee certain levels of performance to end-users, including the rate of data flow, transmission delays, and availability of service. Frame relay networks typically provide for the transport of information within a "committed" information rate (CIR), as well as allowing for bursts of data above the committed rate, which is called the burst excess rate ($B_e$). The CIR is the rate at which the network agrees to transfer information under normal conditions. The CIR is the number of bits of information transferred by the network over a specific time interval ($T_c$), and is typically expressed in bits per second (bps). The committed burst size ($B_c$) is the maximum amount of data (in bits) that a network agrees to transfer under normal conditions over measurement interval $T_c$. The relationship between these parameters is $CIR=B_c/T_c$. The excess burst size ($B_e$) is the maximum amount of uncommitted data (in bits) that the network will attempt to deliver over measurement interval $T_c$. Any bits that exceed $B_c +B_e$ bits in a given measurement interval ($T_c$) are subject to discard by the network.

Typically, data transmitted below CIR is guaranteed by the SLA. Although data transmission above CIR is available and even encouraged, it typically is not guaranteed by the SLA. Instead, the network typically makes a best effort to deliver the burst data, as long as there is excess capacity available in the network (i.e., where there are multiple PVCs on a given physical connection, if one PVC is exhibiting very low data traffic, another PVC can burst over its CIR). When capacity is not available, however, information above the guaranteed CIR is generally discarded by the network, leaving the end user responsible for re-transmitting the data. As an example, a network service provider may offer an SLA that guarantees a 99.5% data delivery ratio (DDR) (i.e., the ratio of data received to data transmitted) for data packets transmitted within the CIR but only a 75% DDR for data packets transmitted above the CIR. These guarantees are based on the fact that during periods of network congestion data packets that exceed the CIR are discarded first in order to alleviate the congestion and decrease the likelihood that the congestion will result in the discard of data packets transmitted within the CIR.

Because data transmission above the CIR may result in data being discarded, proper sizing of the CIR is a key planning parameter for both service providers and end users. One problem with current communication systems is that it is difficult for an end user to adequately determine whether the service provider is meeting its guarantee with respect to data transmission below the CIR. A related problem occurs when the end user's traffic patterns increase to a level exceeding the guaranteed CIR, which can result in data being discarded by the network due to an undersized CIR.

To the extent that current communication systems address these problems at all, such systems are limited to informing the user, in the simplest possible terms, whether or not a PVC needs a larger CIR. At best, such systems merely determine if the CIR is exceeded. If the CIR is exceeded, these systems assume that the CIR should be increased and recommend a non-specific "increase" in the CIR. However, this assumption is often inappropriate for many end user situations because the end user's objectives are not considered. Current systems fail to account for the fact that some users have a higher tolerance for lost data than other users. Furthermore, current systems, whether automatic or manual, are incapable of determining and recommending to the user the amount by which the CIR should be increased. Similarly, there are no current systems, whether automatic or manual, by which the optimum adjustments to the contracted quality of service may be determined dynamically based on the actual performance of the system. Therefore, there is a need in the industry for a system and method that automatically analyze historical data and recommend adjustments to the network service parameters based on such analysis.

SUMMARY OF THE INVENTION

Using historical data and trending analyses, the invention provides a unique method for determining whether any data lost over a given frame relay permanent virtual circuit (PVC) exceeds the user's tolerance for lost data, or whether there is excess capacity within the PVC. The invention calculates a recommended specific change to the committed information rate (CIR) as indicated by the analysis. For example, if the data loss exceeds the user's tolerance for lost data, a specific increase in the CIR is recommended. If the analysis indicates excess capacity, a decrease in the CIR is recommended. Information relevant to the analysis, as well as the ultimate recommendation, are displayed to the user.

The present invention provides an improvement to a communication environment, wherein the invention calculates and presents to an administrator of a communication network, various performance parameter views of the network and calculated recommendations for improvement. This enables the network administrator to determine whether the communications network is delivering the contracted level of service, or whether the traffic characteristics of the customer data are reducing the level of performance of the network. A graphical user interface and a display system may display a PVC trend analysis report, which includes graphical views of various network performance parameters. From this, the system determines the characteristics of the network and a recommended solution.

This task may be accomplished by providing a system for automatically assessing the data transmission performance of a communication network having at least two communication devices and a network management system, the system comprising means for obtaining information regarding a user's tolerance for data lost by the network, means for retrieving historical information collected and stored by the network management system regarding a plurality of network performance parameters, means for analyzing the historical information in view of the user's tolerance information, and means for recommending a change in the committed information rate (CIR) of the communication network as indicated by the analysis. The system may further comprise means for displaying the results of the analysis.

The historical information typically includes the data transmitted, received, and dropped by the network. This information may also be differentiated by whether the data was originally transmitted within or above CIR. The invention analyzes this data and typically calculates and displays trends in: (1) the total data transmitted, received, dropped, both above and within the CIR; and (2) the burstiness of the data transmitted. Based on the user's tolerance for losses above the CIR, which is specified by the user, the system analyzes the historical information to determine whether the current CIR is acceptable or unacceptable. If the current CIR is unacceptable, the system recommends and displays to the user a specific change in the CIR based on its analysis of the historical information.

The present invention can also be conceptualized as a method for analyzing historical information regarding network performance parameters in a network comprising a network management system and at least two communication devices. In accordance with one aspect of the invention, the method may comprise the steps of: obtaining information regarding a specific user's tolerance for lost data, analyzing historical information collected by the network management system regarding a plurality of network performance parameters in view of the user's tolerance for lost data to determine the performance of the network, and recommending a change to the CIR as indicated by the analysis. The method may further comprise displaying the results of the analysis.

The invention has numerous advantages, a few of which are delineated hereafter, as merely examples.

An advantage of the invention is that it automatically determines whether a frame relay network is performing at the level agreed upon in an SLA.

Another advantage of the invention is that it automatically determines whether the CIR needs to be increased based on the actual performance on the network.

Another advantage of the invention is that it automatically recommends a specific amount of increase or decrease in the CIR if it is determined that the CIR needs to be increased or decreased.

Another advantage of the invention is that it automatically predicts when a recommendation for a specific amount of increase or decrease in the CIR will be needed.

Another advantage of the invention is that it takes into account network burstiness in determining whether the CIR needs to be increased.

Another advantage of the invention is that it takes into account the user's tolerances for lost data and excess capacity in determining whether the CIR needs to be increased or decreased.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

FIGS. 4A and 4B are, respectively, graphical and tabular representations of a PVC trend analysis report generated by the PVC trend analysis report logic of FIG. 3.

DETAILED DESCRIPTION OF THE INVENTION

The PVC trend analysis report logic of the present invention can be implemented in software, hardware, or a combination thereof. In a preferred embodiment, the PVC trend analysis report logic is implemented in software that is stored in a memory and that is executed by a suitable microprocessor (uP) situated in a personal computer (PC) or workstation that is part of a communication network management system. However, the PVC trend analysis report program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
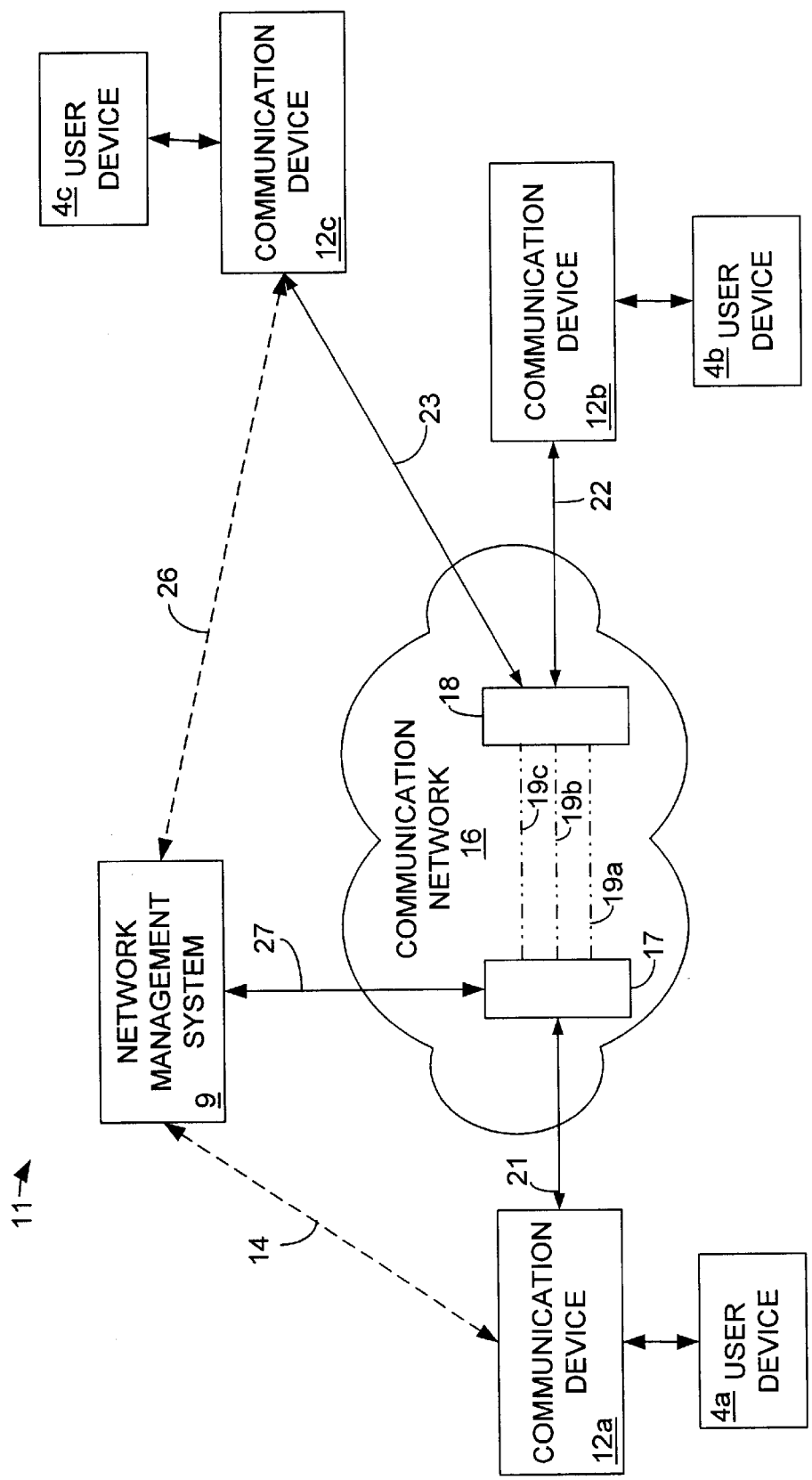
FIG. 1 is a block diagram illustrating a communication environment within which the present invention operates.

FIG. 1 shows a communication environment 11 in which a network management system (NMS) 9 containing PVC trend analysis report logic operates. In general, the communications environment includes a plurality of user devices 4a, 4b, and 4c each connected to one of a plurality of communication devices 12a, 12b, and 12c, respectively. Communication devices 12 may be a wide variety of communication devices, but in a particular aspect of the invention, are frame relay access units (FRAU's). For simplicity, only three FRAU's are depicted in FIG. 1. In practice, communication environment 11 will contain many such communication devices. FRAU's 12a, 12b, and 12c are considered communication endpoints and communicate over communication network 16, in a conventional manner. Communication network 16 can be, for example, any network that provides connectivity for FRAU's 12a, 12b, and 12c, and in the preferred embodiment is a frame relay communication network. Communication network 16 illustratively connects to FRAU's 12a, 12b and 12c over connections 21, 22 and 23, respectively. Connections 21, 22 and 23 can be physical links and can be, for example, T1/E1 service, T3/E3 service, digital data service (DDS), a synchronous data link, or a LAN. The NMS 9 communicates with communication network 16 over management connection 27 and collects network performance information from at least two communication devices connected to communication network 16. The logic of the preferred embodiment of the present invention resides within the NMS 9, as will be discussed hereinafter with respect to FIG. 2.

Communication network 16 is typically characterized by a mesh network of links (not shown) interconnecting a matrix of intermediate nodes (not shown) through frame relay switches 17 and 18. For simplicity only two frame relay switches are illustrated herein, however, communication network 16 will typically contain many switching devices. The links are typically defined by data link connection identifiers (DLCI's), which are used to identify the logical connection over which the subject data is transported. The use of DLCI's allows multiple logical connections to be multiplexed over the same channel.

Information is communicated over the communication network 16 in discrete packets, which may be time multiplexed across shared or common communication links. For example, FRAU 12a may communicate with FRAU 12b over a predefined communication path or link within the frame relay network. This communication path will generally be defined by a number of intermediate nodes. The communication link that interconnects FRAU 12a and FRAU 12b may be completely separate and distinct from that which interconnects FRAU 12a and 12c. Alternatively, a segment of the two above-described communication links may be shared. Whether the links are separate or shared is a function of a number of factors, and generally is determined by the service provider.

Within communication network 16 the communication path between FRAU 12a and FRAU 12b, for example, may be the same in both directions. For example, data transmitted from FRAU 12a to FRAU 12b may traverse the same path (i.e., interconnecting, intermediate nodes) as will data transmitted from FRAU 12b to FRAU 12a. This path of intermediate nodes is defined by DLCI's, and is commonly referred to as a permanent virtual circuit (PVC). This name derives from the fact that the circuit is permanent in that it does not change from transmission to transmission. It is, however, virtual in the sense that a unitary physical connection (such as a dedicated leased line) is not established and maintained between the two end points. For example, communication link 21 may be assigned a DLCI of 120 and communication link 23 may be assigned a DLCI of 130, resulting in a PVC between communication devices 12a and 12c. DLCI's are assigned to and define all the points in a network through which data passes.

In accordance with the invention, NMS 9 communicates with at least two FRAU's (for example, FRAU 12a and FRAU 12c) in order to collect information from each FRAU, the information being relative to the performance of the communication network 16. For example, information such as transmit burst analysis—the generation of which is disclosed in commonly assigned co-pending U.S. patent application Ser. No. 09/118,106, entitled "SYSTEM AND METHOD FOR CHARACTERIZING BURST INFORMATION", filed on Jul. 17, 1998, and which is hereby incorporated by reference—and information such as network latency and data delivery success—the generation of which is disclosed in commonly assigned co-pending U.S. patent application Ser. No. 09/144,926, entitled "SYSTEM AND METHOD FOR THE MEASUREMENT OF SERVICE QUALITY IN A COMMUNICATION NETWORK", filed on Sep. 1, 1998, and which is hereby incorporated by reference—may be collected by the NMS 9. Other network performance parameters, such as CIR and $B_e$, may also be collected from FRAU's 12a and 12c by NMS 9. NMS 9 communicates with FRAU 12a over connection 14 and with FRAU 12c over connection 26. While shown as discrete connections, connections 14 and 26 may also be through communication network 16.

Figure 2:
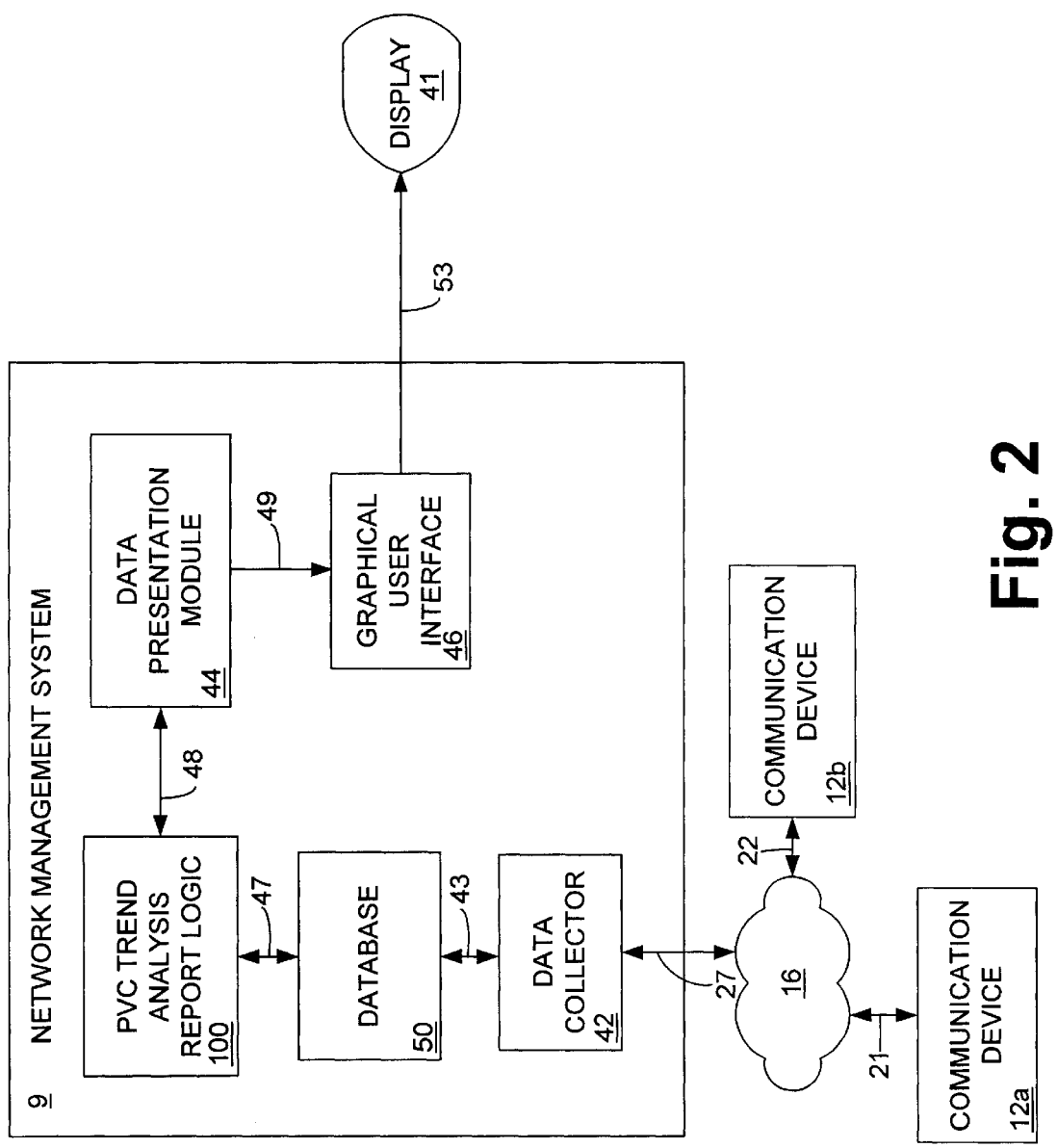
FIG. 2 is a block diagram illustrating a network management system employing the PVC trend analysis report logic of the present invention.

Referring now to FIG. 2, shown is a block diagram illustrating a NMS 9, containing the PVC trend analysis report logic 100 of the present invention. NMS 9 contains a number of elements that allow for the monitoring and management of communication devices 12 that are operating over communication network 16. In accordance with an aspect of the invention, NMS 9 includes data collector 42, which receives information relative to a particular PVC over which at least two communication devices 12a and 12c, for example, are operating. Although shown as connecting to NMS 9 through communication network 16, FRAU's 12a and 12b may connect directly to NMS 9.

Data collector 42 collects information such as, but not limited to, transmit bit burst analysis and end-to-end data delivery success, relating to FRAU's 12a and 12b. Data collector 42 supplies this information over connection 43 to database 50. In order for the PVC trend analysis report logic 100 to calculate an accurate recommendation for a revised CIR, the data collector 42 must collect an amount of historical information sufficient to establish a baseline for meaningful trends. The historical information may be collected over any period of time that is pertinent to the user, such as, for example, weekly or monthly. Such a pertinent time period is referred to herein as a reporting period. In some cases, adequate information may be obtained in as few as four complete reporting periods. However, the accuracy of the analysis typically improves as additional historical information is obtained. Since the usage of a particular PVC may vary seasonally or otherwise cyclically over long periods of time, the particular reporting periods should be specified by each particular user to increase the relevance of the results. Periods of little interest (such as, for example, periods outside normal business hours) may be excluded in order to avoid skewing the historical information.

The historical information collected by data collector 42 and placed in database 50 typically includes the data transmitted, both within and above the CIR, as well as the degree of bursting above CIR. To facilitate the analysis, the historical information regarding data transmitted above the CIR is typically divided into ranges that measure the amount by which the data exceeds the CIR, although this division is not required. The collection of this historical information should be done in real-time because averaging, no matter how frequent the samples, can result in peak losses.

The historical information collected by data collector 42 also typically includes the data received, both within and above the CIR, as well as the data dropped (i.e., lost) by the network. This enables the logic to compare the data that was originally transmitted with the data that was actually received, both within and above the CIR.

Communication channels 21, 22 and 27 are typically the physical connections that connect the NMS 9, and FRAUs 12a, 12b and 12c, to communication network 16. However, communication channels 21, 22 and 27 can be any medium for connecting the NMS 9 and FRAUs 12 to a communication network.

PVC trend analysis report logic 100 retrieves the historical information from database 50 over connection 47. PVC trend analysis report logic 100 then analyzes the individual pieces of information and generates the PVC trend analysis report (illustrated in FIGS. 4A and 4B, and discussed in detail hereinafter).

PVC trend analysis report logic 100 delivers the report over connection 48 to data presentation module 44, which formats the information for presentation. Data presentation module 44 forwards the formatted information over connection 49 to graphical user interface (GUI) 46. GUI 46 prepares the information for presentation to a network administrator over display 41 via connection 53.

Figure 4A:
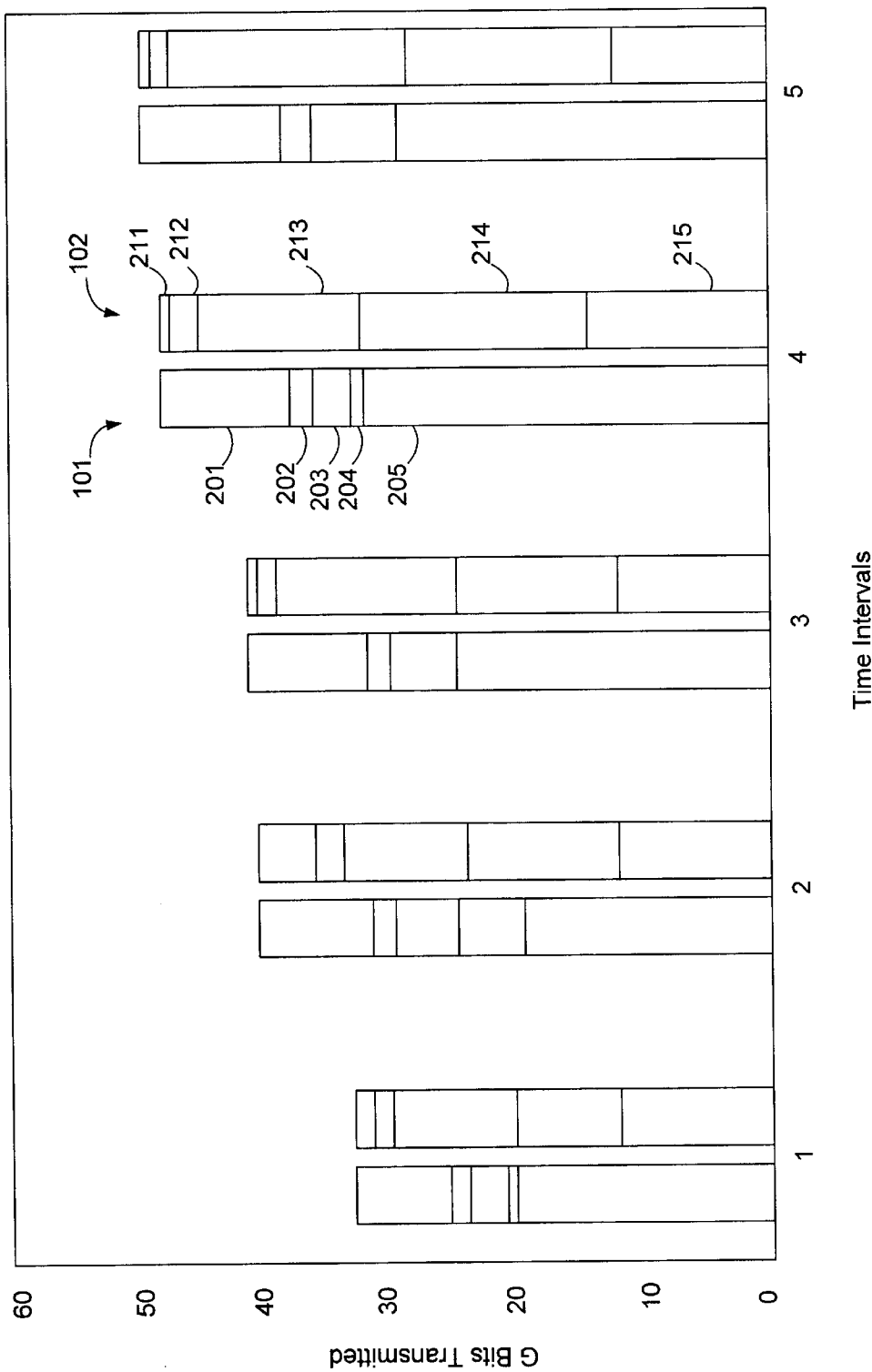

PVC trend analysis report logic 100 allows for the analysis and display of various network performance parameters relative to at least two FRAU's 12. For example, a network administrator may be operating a network management terminal and request a PVC trend analysis report. The PVC trend analysis report (a sample of which is illustrated in FIGS. 4A and 4B) automatically provides the network operator with a determination of whether the network is performing as desired over a particular PVC. If the performance is below the user's acceptable level of performance, the PVC trend analysis report logic 100 automatically recommends a specific adjustment to the CIR so that such performance can be achieved.

Figure 3:
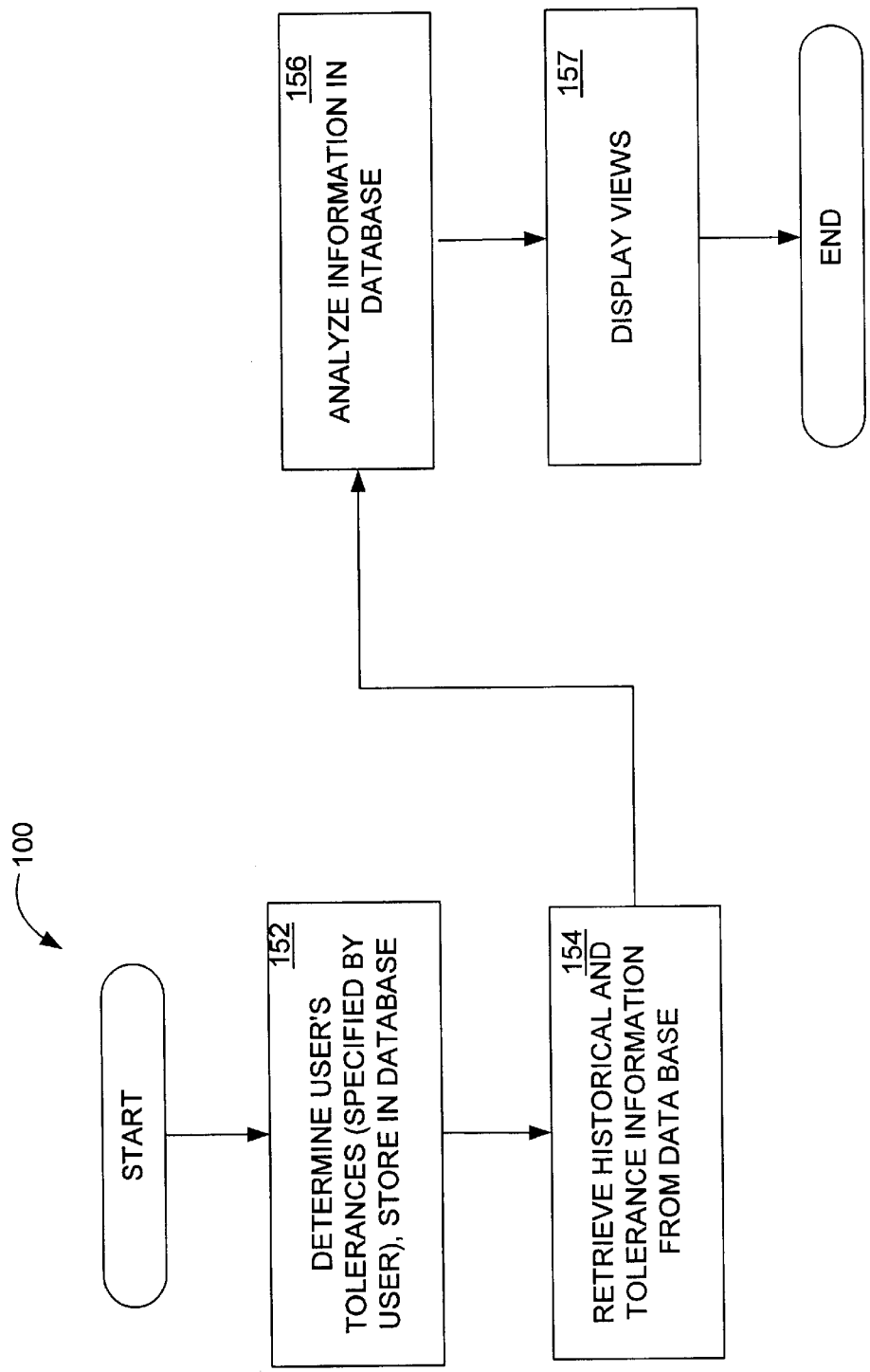
FIG. 3 is a flow diagram illustrating the operation of the PVC trend analysis report logic of FIG. 2.

FIG. 3 is a flow diagram illustrating the operation of the PVC trend analysis report logic 100 of FIG. 2 as applied to generating a typical PVC trend analysis report.

The flow chart of FIG. 3 shows the architecture, functionality, and operation of a possible implementation of the PVC trend analysis report software of FIG. 2. In this regard, each block may represent a module, segment, or portion of code, which comprises one or more executable instructions for implementing the specified logical function (s). It should also be noted that in some alternative implementations, the functions noted in the blocks may occur out of the order noted in FIG. 3. For example, two blocks shown in succession in FIG. 3 may in fact be executed substantially concurrently, the blocks may sometimes be executed in the reverse order, or some of the blocks may not be executed in all instances, depending upon the functionality involved, as will be further clarified hereinbelow.

In block 152, the PVC trend analysis report logic 100 queries the user for information particular to each PVC and stores this information in database 50 (of FIG. 2). This information will typically include the user's level of tolerance for data dropped by the system that was originally transmitted above the CIR. The user's level of tolerance may be expressed in several ways, including as a percentage of all the data transmitted above the CIR, or as a specific number of bits. If the user's SLA includes any guarantee for data delivery above the CR, the user's tolerance level typically would be the difference between 100% of the data transmitted above CIR and the guaranteed value. If the user's SLA does not provide any guarantee for data delivery above the CIR, the user can choose a similar tolerance level.

The PVC information obtained in block 152 and stored in database 50 (of FIG. 2) may also include the user's tolerance for unused CIR, which is typically expressed as a percentage of the CIR. In situations where usage is decreasing, this information will allow the logic to indicate that a reduction in CIR is appropriate and to recommend how much the CIR should be reduced.

In block 154, the PVC trend analysis report logic 100 retrieves the historical and tolerance information from the database 50. In block 156, the PVC trend analysis report logic 100 analyzes the information retrieved from the database in step 154. This analysis typically includes trending and forecasting of the total data transmitted, the total data sent above CIR, the data sent above CIR but lost, the acceptable data lost above CIR, the data occurring in each of the burst ranges, and weighing of the burst range projections, as well as a recommended CIR based on the trending and forecasting of these items.

Finally, in step 157, the PVC trend analysis report logic 100, in cooperation with graphical user interface 46, generates a graphical representation of the information and presents a PVC trend analysis report to a user over display 41.

FIGS. 4A and 4B are, respectively, graphical and tabular representations of a possible manner in which the PVC trend analysis report generated by the PVC trend analysis report logic 100 of FIGS. 3 and 4 may be displayed. With reference to FIG. 4A, a pair of stacked bars 101 and 102 represent, respectively, the data received and lost 101 and the actual bursts of the data 102 (expressed in Gigabits (Gbits)) for each time interval (e.g., weekly, monthly, etc.) during which the historical information is collected. In the illustration of FIG. 4A, five weekly time intervals (1 through 5) are depicted. However, this is only for purposes of illustration, and the number of time intervals actually depicted will depend on the number of time intervals chosen as constituting a representative sample of the activity on the PVC under consideration.

The two bars 101 and 102 are typically the same height, as each bar typically accounts for all of the data transmitted. The two bars 101 and 102 illustrate visually the relationship between the actual data delivery versus loss (bar 101) and the burstiness of the data (bar 102) for each time interval.

To more fully illustrate graphically the total amount of data received and lost for each time interval, bar 101 is further divided into five vertical segments, numbered from top to bottom as elements 201 through 205 in FIG. 4A. The data represented graphically by segments 201 through 205 is also presented numerically in tabular form as table rows 301 through 305 of FIG. 4B for each of the time intervals 1 through 5. Unless otherwise noted, the numerical values in FIGS. 4A and 4B are expessed in Gbits.

Segment 201 and table row 301, respectively, present graphical and numerical representations of the unacceptable data lost above CIR, which correspond to the number of bits of data that were originally transmitted above the CIR and lost by the network, and that exceed the acceptable loss threshold designated by the user and depicted in cell 324 of FIG. 4B, which in this example is 10%.

Segment 202 and table row 302, respectively, present graphical and numerical representations of the acceptable data lost above the CIR, which correspond to the number of bits of data that were originally transmitted above the CIR and lost by the network, but which are within the acceptable loss threshold designated by the user in cell 324.

Segment 203 and table row 303, respectively, present graphical and numerical representations of the data received above the CIR, which correspond to the number of bits of data that were originally transmitted above the CIR that were actually received.

Segment 204 and table row 304, respectively, present graphical and numerical representations of the data transmitted within the CIR that was dropped by the network, which correspond to the number of bits of data that were originally sent within the CIR, but that were lost by the network. Segment 204 is shown for completeness to present graphically a full accounting of all the data transmitted. The present invention assumes that this loss will be insignificant, as indicated in the values presented in table row 304. The problem presented by significant amounts of data originally sent within the CIR being lost by the network is outside the scope of the recommendations provided by the present invention.

Segment 205 and table row 305, respectively, present graphical and numerical representations of the data received within the CIR, which correspond to the number of bits of data originally transmitted within the CIR that were received.

To more fully illustrate graphically the actual bursts of the data for each time interval, bar 102 of FIG. 4A is further divided into five segments 211 through 215, with each of the segments representing a burst range. The burst ranges represented graphically by segments 211 through 215 of FIG. 4A are also presented numerically in tabular form as table rows 311 through 315 of FIG. 4B. These burst ranges reflect the range values configured in the device for recording the actual peak burst bit counts of the transmitted data. Although the number of burst ranges used in this example is five, a different number could be used. Typically expressed as a percentage of CIR, the burst ranges include all transmitted data up to the burst excess ($B_e$). The burst ranges can also include data transmitted above $B_e$ (not shown).

The break point between the lowest range (presented graphically by segment 215 and numerically by table row 315), and the next highest range (presented graphically by segment 214 and numerically by table row 314), which is referred to herein as "Low Tx", represents the downward trend point at which a user may desire a lower CIR. For a new user, the top of the first range is typically set to 60% of the CIR and the top of the second range is typically set to 100% the CIR. The upper ranges (presented graphically by segments 211 through 213 and numerically by table rows 311 through 313) are typically evenly spread over the remaining excess over the CIR up to the $B_e$. Although not illustrated in FIGS. 4A and 4B, data above the $B_e$ may also be presented and used in the calculations.

FIG. 4B also presents, in columns 320 and 321 numerical values for the trend of information presented in each of table rows 301 through 305 and 311 through 315 over the total number of time intervals involved, which in the example of FIGS. 4A and 4B is five time intervals. Column 320 expresses the trend as a percentage of the total transmitted traffic. Column 321 expresses the trend in terms of the number of bits of data. Trending is done by linear regression of a parameter's given data points over time by fitting a straight line though all the data points. All analysis and calculations are then performed on the straight line, which means that the results shown in the columns 320 and 321 may be somewhat different than if the raw data was used. However, by using linear regression, the results tend to be more reliable. The trend of the line may be upward (+), stable (0), or downward (−). Trend values of $\leq \pm 10\%$ are typically treated as 0 in calculating a recommended CIR, as discussed hereinafter.

Table row 322 presents a numeric value for the loss above CIR. This value represents the percentage of data sent above CIR that has been lost, and can be directly compared to the user defined acceptable loss above CIR value, which is set by the user and presented in table cell 324. The acceptable loss above CIR is a user-defined value of the amount of all data sent above CIR that the user is willing to tolerate losing, expressed as a percentage (as specified by the user in step 152 of FIG. 3).

Table row 323 presents a numerical value for the total amount of data transmitted in each reporting period, less any data transmitted over $B_e$. This value is referred to as "TotalTx."

Table cell 325 presents a numerical value for the current CIR. Table cell 326 presents a numerical value for a recommended CIR. This numerical value is calculated by the PVC trend analysis report program 100, as discussed below, based on the historical information and user information illustrated in FIGS. 4A and 4B.

Figure 5A:
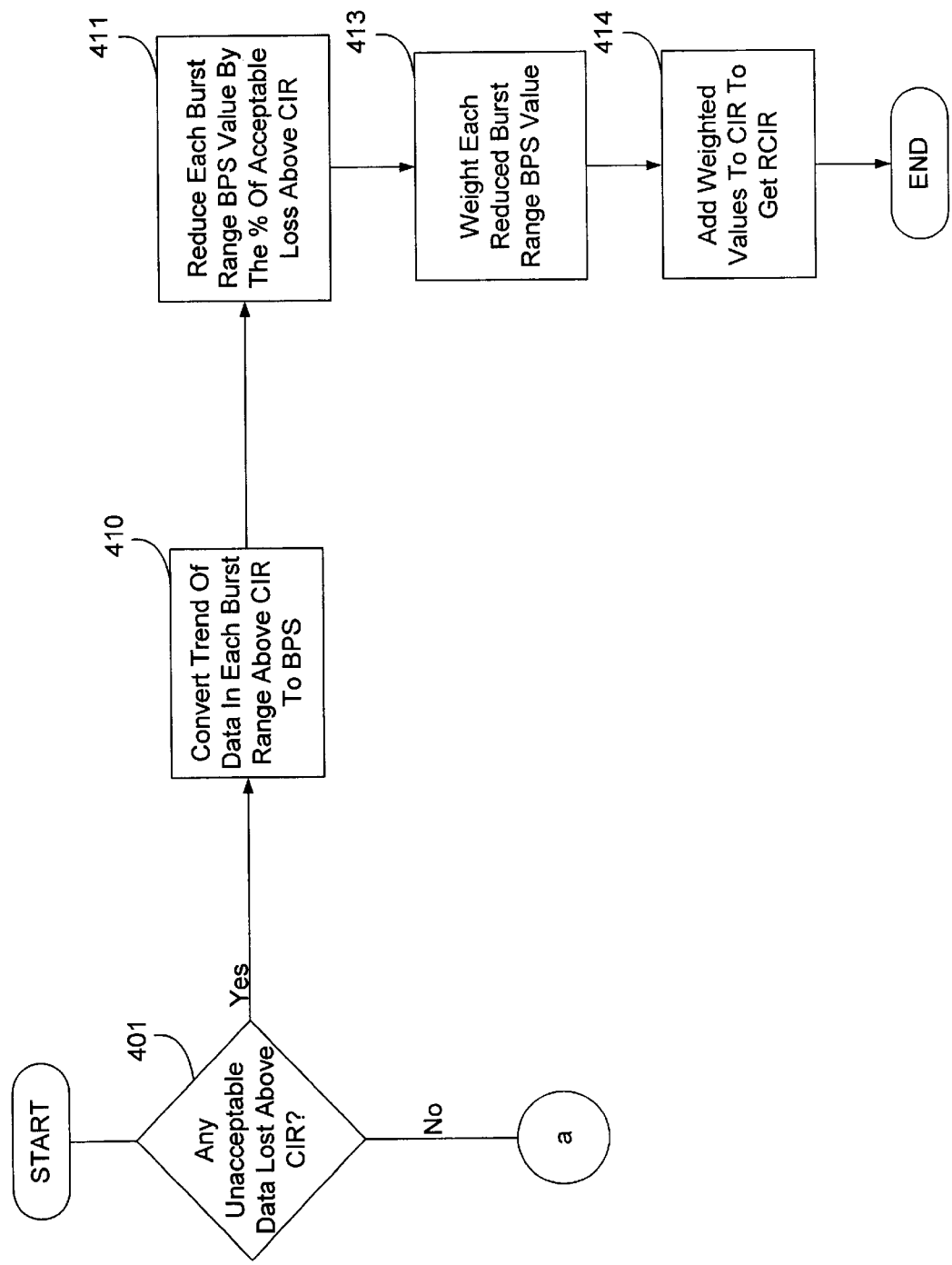
FIGS. 5A and 5B are flow diagrams illustrating in greater detail the calculations block of the PVC trend analysis report logic of FIG. 3, as applied to the information presented in FIGS. 4A and 4B.
Figure 5B:
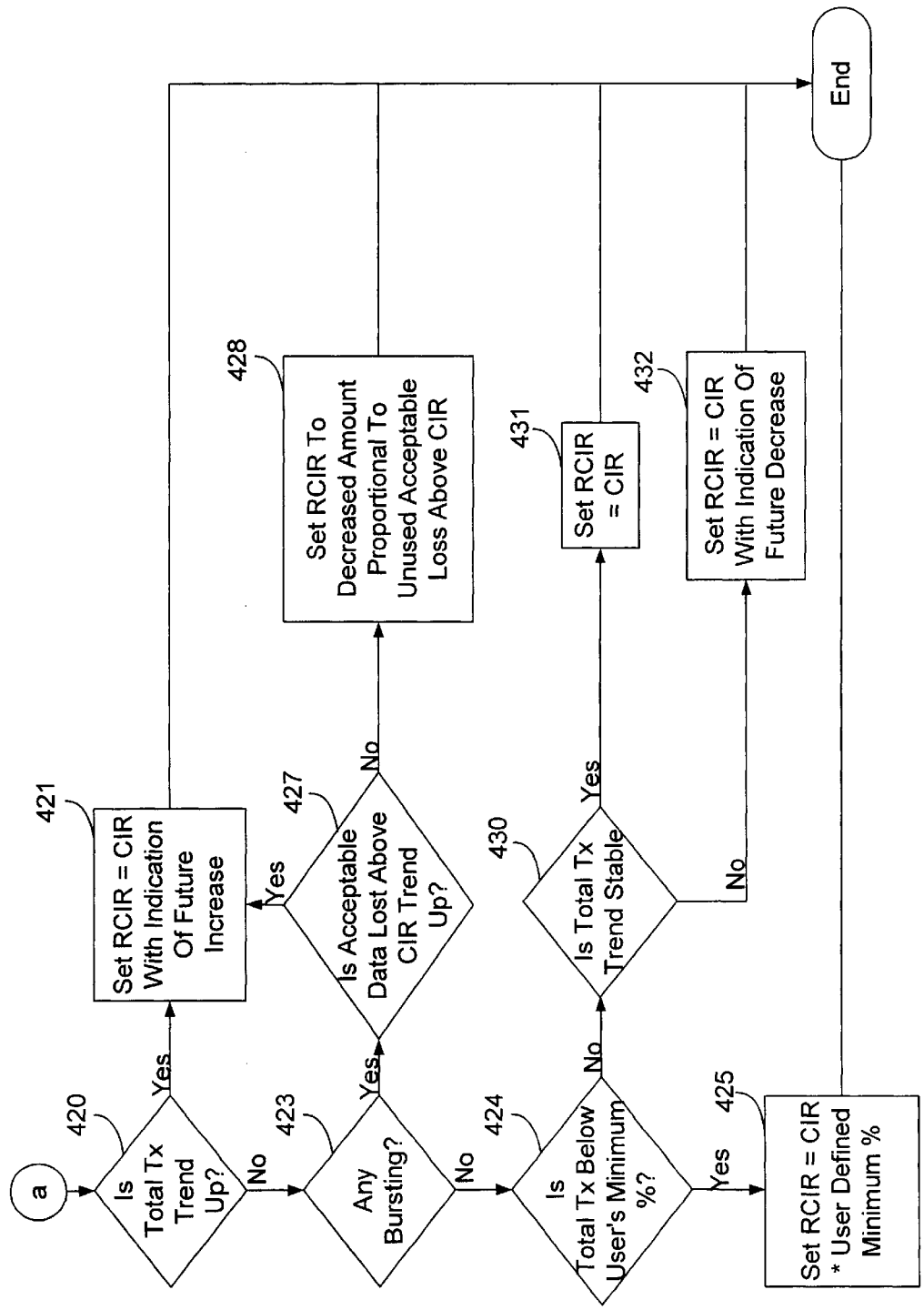

FIGS. 5A and 5B are flow diagrams illustrating one method of the manner in which block 156 of the PVC trend analysis report logic 100 of FIG. 3 may use the information illustrated in FIGS. 4A and 4B to calculate a recommended CIR, which is presented to the user in cell 326 of FIG. 4B.

With reference to FIG. 5A, in step 401 the logic determines, for a particular PVC, if there is any unacceptable data lost above the CIR (i.e., row 301 of FIG. 4B). If it is determined in step 401 that there is any unacceptable data lost above the CIR, the logic proceeds to step 410. In step 410, the logic converts the trend for each burst range above CIR (from rows 311, 312 and 313 and column 321 of FIG. 4B) into bits per second (bps) by dividing the trend (which is expressed in the number of bits) by the number of seconds in the summary interval that are of interest to the user. For example, if the summary interval is 1 week, and the period of interest to the user is Monday through Friday from 9:00 a.m. to 5:00 p.m., the number of bits will be divided by 144,000 seconds (i.e., (5 days)*(8 hours/day)*(60 minutes/hour)*(60 seconds/minute)).

In step 411, the logic reduces the number of bps for each burst range above CIR calculated in step 410 by the percentage of acceptable loss above CIR designated by the user. In the example of FIG. 4B, the acceptable loss above CIR, designated by the user in cell 324, is 10%. Therefore, the number of bps for each burst range above CIR is multiplied by 0.9 in step 411.

In step 413, the logic weights the reduced number of bps for each burst range calculated in step 411. Because unacceptable data lost at higher burst ranges will necessitate a greater increase in the CIR than unacceptable data lost at lower burst ranges, the higher burst ranges will be weighted more heavily than the lower burst ranges. In a preferred embodiment, step 413 will weight the burst ranges by multiplying the reduced bps for the lowest burst range by 1, multiplying the reduced bps for the next highest burst range by 2, and, following this progression, by increasing by one the multiplier for each successive burst range, so that the highest burst range will be multiplied by n, with n being the total number of burst ranges above CIR. Thus, using the burst ranges illustrated in FIG. 4B, the reduced bps for the burst ranges are multiplied as follows: row 313*1, row 312*2, and row 311*3. These weighting values are somewhat arbitrary, and could be different in another embodiment.

In step 414, the logic calculates a new recommended CIR (RCIR) by adding each of the weighted values calculated in step 413 to the CIR.

If it is determined in step 401 that there is no acceptable data lost above the CIR, the logic proceeds to step 420, as illustrated in FIG. 5B. In step 420 the logic determines whether the trend of the total data transmitted (Total Tx trend, row 323, column 321 of FIG. 4B) is up or down. If it is determined in step 420 that the Total Tx trend is upward, the logic proceeds to step 421.

In step 421, the logic sets the RCIR equal to the current CIR (i.e., no change). The logic also provides an indication that a future increase in the CIR will likely be needed due to the increasing trend in the Total Tx. The increase will be indicated at the earliest occurrence of: (1) the point at which the Total Tx trend line equals or exceeds the CIR or, (2) the point at which the acceptable data lost above CIR equals or exceeds the percentage of the total bits transmitted above the CIR specified by the user in cell 324 of FIG. 4B (i.e., the unacceptable data lost above CIR becomes greater than zero).

If it is determined in step 420 that the Total Tx is stable or downward, the logic proceeds to step 423. In step 423, the logic determines whether there is any bursting on the PVC (i.e., whether the trend of all the data originally transmitted above the CIR is >1% of the trend of the total data transmitted, which may be determined by summing the number of bits in rows 311, 312 and 313 of FIG. 4B for each of the five time intervals, trending these sums by linear regression, and dividing the result by the trend of the total data transmitted, which in the example of FIG. 4B is 50.0). If it is determined in step 423 that there is no bursting on the PVC, the logic proceeds to step 424.

In step 424, the logic determines if the Total Tx is below a minimum acceptable percentage of the CIR, which is set by the user. Typically, the minimum acceptable percentage will be the top of the first burst range illustrated in row 315 of FIG. 4B, which in this example is 60% of the CIR. This parameter is typically set at 60% of CIR for the first evaluation of a particular PVC, and may be adjusted upward or downward by the user as desired after observing the trends.

If it is determined in step 424 that the Total Tx is below the user's acceptable minimum percentage of the CIR, the logic proceeds to step 425 and recommends an RCIR that is equal to the CIR * the user defined minimum acceptable percentage. For example, if the user's minimum acceptable percentage is 60% of the current CIR, step 425 will recommend a decreased RCIR equal to CIR * 0.6.

If it is determined in step 424 that the Total Tx is not below the user's acceptable minimum percentage of the CIR, the logic proceeds to step 430. In step 430, the logic determines if the Total Tx trend is stable. If the Total Tx trend is stable, the logic proceeds to step 431 and recommends that the CIR not be changed (i.e., RCIR=CIR, or no change), with no further recommendation.

If step 430 determines that the Total Tx trend is decreasing, the logic proceeds to step 432. In step 432, the logic sets the RCIR equal to the current CIR (i.e., RCIR= CIR, or no change). The logic also provides an indication that a future decrease in the CIR will likely be needed due to the decreasing trend in the Total Tx. The decrease will be indicated at the point at which the Total Tx trend line equals or is less than the user's acceptable minimum percentage of the CIR.

If it is determined in step 423 that there is bursting on the PVC, the logic proceeds to step 427 and determines if the trend of the acceptable data lost above CIR trend (row 302, column 320 of FIG. 4B) is upward. If it is determined in step 427 that the trend of the acceptable data lost above CIR is upward, the logic proceeds to step 421, where the logic sets the RCIR equal to the current CIR (i.e., no change) and provides an indication that a future increase in the CIR will likely be necessary (as discussed above).

If it is determined in step 427 that the trend of the acceptable data lost above CIR is not upward (i.e., if the trend is stable or downward), the logic proceeds to step 428. In step 428, the logic sets the RCIR to the CIR, less an amount proportional to the unused acceptable loss above CIR. For example, in FIG. 4B the user's designated acceptable loss above CIR is 10% (cell 324) of the total data transmitted above CIR. If the data lost above CIR (i.e., loss above CIR, row 322) had been equal to 4%, then the CIR could theoretically be reduced by an amount equal to 10%–4% of the total transmitted above CIR, or 6%.

Because this would represent the absolute minimally tolerable CIR, however, the reduction in the CIR recommended in step 428 is preferably less than the full amount of the unused portion of the acceptable loss above CIR. In order to avoid the potential of undersizing the CIR, which could result in unacceptable data losses, in a preferred embodiment a conservative approach is taken, and the reduction is set to ½ of the unused portion of the acceptable loss. Using the user's designated acceptable loss above CIR of 10% (from cell 324 of FIG. 4B), the RCIR=(CIR*(100%– ½(10%–4%))=0.97*CIR.

Appendix A below contains a pseudocode representation of the logic used in the preferred embodiment, and illustrated by the flowcharts of FIGS. 5A and 5B. The pseudocode used in Appendix A is, essentially, a computer language using universal computer language conventions. While the pseudocode employed herein has been included solely for the purposes of this description, it is designed to be easily understandable to any computer programmer skilled in the art.

The following definitions are applicable to the pseudocode:

1. RCIR: the recommended CIR. If RCIR is less than 5% from CIR, the RCIR is considered to be equal to the CIR.
2. ADLAC: Acceptable Data Lost Above CIR. The ADLAC value may range from zero to an amount equal to the total bits transmitted above CIR times the ALAC % entered by the user.
3. ALAC: Acceptable Loss Above CIR, a percentage of the total bits transmitted above CIR. The percentage is determined by the user and shown in the ALAC % in cell 324 of FIG. 4B.
4. AllTxAboveCIR: all data originally transmitted above CIR (i.e., the sum of rows 311, 312 and 313 of FIG. 4B).
5. Burst Table Ranges: Either the $1^{st}$ or $2^{nd}$ burst table range must be set to CIR for any RCIR to be valid.

However, for a new PVC, it is recommended that the user set the two ranges to 60% of CIR and to CIR, respectively, as illustrated in rows 315 and 314 of FIG. 4B, and adjust as desired after observing trends.

6. LossAboveCIR: The total data lost above CIR divided by the total data transmitted above CIR.

7. LowTx: The level at which user may want to lower CIR. By default this value is considered to be the top of the $1^{st}$ Burst Table Range. It is recommended that the user set this parameter at 60% of CIR for a new PVC and adjust as desired after observing trends. Low Tx is converted to bits by multiplying by CIR and the number of seconds in the reporting interval.

8. TL: Trend Location. The forecasted location of the last given data point of the Trend.

9. TotalTx: The total amount of data transmitted, less any transmitted over $B_e$ (row 323 of FIG. 4B).

10. Trend: A linear regression of the parameter over time (i.e., a straight line fitted to all the given data points). The trend of the line will be up (+), stable (0), or down (−). A Trend of ±10% in the calculations below will be considered as 0.

11. UDLAC: Unacceptable Data Lost Above CIR (i.e., row 301 of FIG. 4B).

Appendix A

Pseudocode for Analysis and Calculations

If UDLAC≦0 (i.e., total loss is acceptable):
  If TotalTx Trend is down or stable:
    If AllTxAboveCIR TL is nil (<1% of TotalTx TL) (i.e., no bursting):
      If TotalTx TL is below or equal to minimum (i.e., LowTx converted to bits): RCIR=CIR*LowTx %.
      Else if TotalTx TL is above minimum (i.e., LowTx converted to bits):
        If TotalTx TL is stable: RCIR=No change.
        Else if TotalTx TL is down: RCIR=No change, with projected future decrease at the intersection of TotalTx TL and LowTx.
    Else (there is bursting):
      If ADLAC Trend is up: RCIR=No change, with projected future increase at the intersection of ADLAC TL and ALAC (i.e., when UDLAC becomes non-zero).
      Else if ADLAC Trend is down or stable: RCIR=CIR*(100%−(UserDefinedALAC %−LossAboveCIR)/2). (i.e., decrease CIR proportionally to the unused ALAC).
  Else if TotalTx Trend is up: RCIR=No change, with projected future increase at the intersection of TotalTx TL and CIR, or the intersection of ADLAC and ALAC, whichever comes first.
Else if UDLAC>0 (i.e., there is unacceptable data loss above CIR):
  Trend the individual burst range values above CIR (i.e., n=the total number of burst ranges above CIR).
  Convert the last trend location of each range to bps.
  Reduce each bps by the % of ALAC.
  RCIR=CIR+Σ(bps for Lowest range*1+bps for NextLowest*2+ . . . bps for Highest*n).

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention, as defined in the claims that follow.

Therefore, the following is claimed:

1. A system for automatically assessing the data transmission performance of a communication network having at least two communication devices and a network management system, the system comprising:
   means for obtaining information regarding a user's tolerance for data lost by the network;
   means for retrieving historical information regarding a plurality of network performance parameters, said historical information being collected and stored by the network management system;
   means for analyzing said tolerance information and said historical information;
   means for calculating a recommendation to change the committed information rate (CIR) of the communication network to a specific value based on the analysis of the analyzing means; and
   means for displaying said analysis and recommendation to the user.

2. The system of claim 1, wherein said obtaining means obtains information regarding a user's tolerance for unused CIR.

3. The system of claim 1, wherein said plurality of network performance parameters comprises:
   a total amount of data transmitted over a given frame relay permanent virtual circuit (PVC) during a specific time interval; and
   a total amount of data received over said PVC during said time interval.

4. The system of claim 3, wherein said plurality of network performance parameters further comprises:
   a total amount of data transmitted over said PVC during said time interval that is within the committed information rate (CIR) for said PVC;
   a total amount of data transmitted over said PVC during said time interval that is above the CIR for said PVC; and
   a total amount of data transmitted above the CIR for said PVC during said time interval that is lost by the network.

5. The system of claim 4, wherein said plurality of network performance parameters further comprises the burstiness of the data transmitted over said PVC during said time interval.

6. The system of claim 1, wherein said means for calculating a recommendation comprises:
   means for calculating a recommendation to increase the CIR when the data loss exceeds the user's tolerance; and
   means for calculating a recommendation to decrease the CIR when the data loss is below the user's tolerance.

7. The system of claim 6, wherein the means for analyzing further comprises means for analyzing trends in said historical information, and the means for calculating further comprises means for predicting a recommendation based on said trends.

8. In a communication network having at least two communication devices and a network management system, a method for automatically assessing the data transmission performance of the network, the method comprising the steps of:

obtaining information regarding a user's tolerance for data lost by the network;

retrieving historical information regarding a plurality of network performance parameters, said historical information being collected and stored by the network management system;

analyzing said tolerance information and said historical information;

calculating a recommendation to change the committed information rate (CIR) of the communication network to a specific value based on the analysis of the tolerance information and historical information; and displaying said analysis and recommendation to the user.

9. The method of claim 8, wherein said obtaining step further comprises obtaining information regarding a user's tolerance for unused CIR.

10. The method of claim 8, wherein said analyzing step further comprises:

determining a total amount of data transmitted over a given frame relay permanent virtual circuit (PVC) during a specific time interval; and determining a total amount of data received over said PVC during said time interval.

11. The method of claim 10, wherein said analyzing step further comprises:

determining a total amount of data transmitted over said PVC during said time interval that is within the committed information rate (CIR) for said PVC;

determining a total amount of data transmitted over said PVC during said time interval that is above the CIR for said PVC; and determining a total amount of data above the CIR for said PVC that is lost by the network during said time interval.

12. The method of claim 11, wherein said analyzing step further comprises:

determining the burstiness of the data transmitted over said PVC during said time interval.

13. The method of claim 8, wherein said step of calculating a recommendation comprises:

calculating a recommendation to increase the CIR when the data loss exceeds the user's tolerance; and calculating a recommendation to decrease the CIR when the data loss is below the user's tolerance.

14. The method of claim 13, wherein the step of analyzing further comprises a step of analyzing trends in said historical information, and the step of calculating further comprises a step of predicting a recommendation based on said trends.

15. In a communication network having at least two communication devices and a network management system, a computer readable medium having a program for automatically assessing the data transmission performance of the network, the program comprising logic configured to perform the steps of:

obtaining information regarding a user's tolerance for data lost by the network;

retrieving historical information regarding a plurality of network performance parameters, said historical information being collected and stored by the network management system;

analyzing said tolerance information and said historical information;

calculating a recommendation to change the committed information rate (CIR) of the communication network to a specific value based on the analysis of the tolerance information and historical information; and displaying said analysis and recommendation to the user.

16. The program of claim 15, wherein said obtaining step further comprises obtaining information regarding a user's tolerance for unused CIR.

17. The program of claim 15, wherein said analyzing step further comprises:

determining a total amount of data transmitted over a given frame relay permanent virtual circuit (PVC) during a specific time interval; and determining a total amount of data received over said PVC during said time interval.

18. The program of claim 17, wherein said analyzing step further comprises:

determining a total amount of data transmitted over said PVC during said time interval that is within the committed information rate (CIR) for said PVC;

determining a total amount of data transmitted over said PVC during said time interval that is above the CIR for said PVC; and determining a total amount of data above the CIR for said PVC that is lost by the network during said time interval.

19. The program of claim 18, wherein said analyzing step further comprises:

determining the burstiness of the data transmitted over said PVC during said time interval.

20. The method of claim 15, wherein the step of calculating a recommendation comprises:

calculating a recommendation to increase the CIR when the data loss exceeds the user's tolerance; and calculating a recommendation to decrease the CIR when the data loss is below the user's tolerance.

21. The method of claim 20, wherein the step of analyzing further comprises a step of analyzing trends in said historical information, and the step of calculating further comprises a step of predicting a recommendation based on said trends.

* * * * *

UNITED STATES PATENT AND TRADEMARK OFFICE
CERTIFICATE OF CORRECTION

PATENT NO. : 6,912,575 B1
DATED : June 28, 2005
INVENTOR(S) : Swift et al.

It is certified that error appears in the above-identified patent and that said Letters Patent is hereby corrected as shown below:

Column 3,
Line 49, delete "B, + $B_e$" and insert -- $B_c + B_e$ --.

Column 10,
Line 62, delete "expessed" and insert -- expressed --.

Column 18,
Lines 45 and 52, delete "method" and insert -- program --.

Signed and Sealed this

Twenty-seventh Day of December, 2005

JON W. DUDAS
*Director of the United States Patent and Trademark Office*